May 26, 1931.  J. C. STIMSON  1,807,350
REFLECTING DEVICE
Filed Nov. 3, 1928

Inventor:
Jonathan Cass Stimson,
By John N. Buninga
His Attorney.

Patented May 26, 1931

1,807,350

UNITED STATES PATENT OFFICE

JONATHAN CASS STIMSON, OF ST. LOUIS, MISSOURI

REFLECTING DEVICE

Application filed November 3, 1928. Serial No. 316,997.

This invention relates to reflecting devices and more particularly to reflecting devices of the character designed for signalling and aids to traffic.

In reflecting devices of the character referred to and as for instance, illustrated in Patent No. 1,591,572, July 6 1926 and Patent No. 1,671,086, May 22, 1928, a series of reflecting units are arranged in contiguous relation and are adapted to direct light impinging thereon at various angles back approximate the light source. Where such a reflector is employed as a road sign or signal, by placing the same at danger points or by employing the same as a tail reflector on automobiles, the reflection of a beam from the head light of an approaching automobile will cause a reflected beam to be directed to the automobile driver in order to apprise him of the fact that he is approaching a danger point or that he is approaching a designated location. For danger signals, it is customary to color the reflected beam by interposing a light coloring screen in front of the reflecting surfaces; where the reflector is of the transparent prismatic type having total reflecting surfaces, the prismatic plate itself is color tinted so as to produce the desired or required coloring of the light.

With reflectors of the character referred to and particularly where a color signal is desired or required, the observance of a color effect is interferred with due to the fact that there will be a surface reflection of the impinging light from the front face of the reflector; and as the reflected light, due to surface reflection, is not colored it may diminish and even overcome the effect of the colored reflected light to such an extent that the desired color effect is not observed. This is particularly true where the impinging beam is from an automobile head light; in such a case the image of the head light may appear upon the reflector by surface reflection, particularly when the beam impinges normal to that surface.

One of the objects of this invention, therefore, is to provide a reflecting device of the character referred to in which these disadvantageous features are overcome so that a colored signal can always be readily observed.

Further objects will appear from the detail description taken in connection with the accompanying drawings, in which Fig. 1 is a face view of a reflector embodying this invention;

Figure 1:
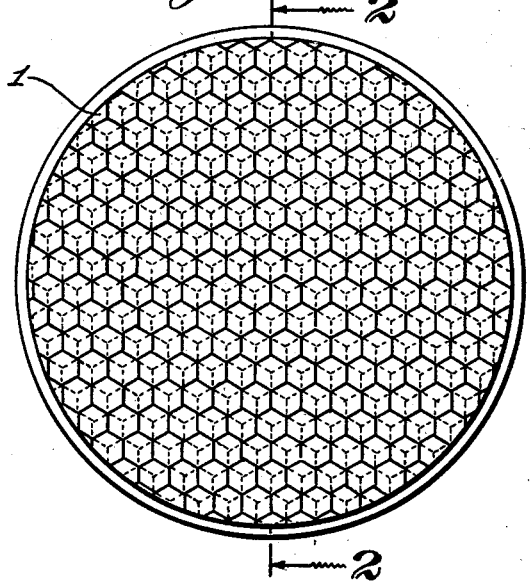

Generally stated in accordance with this invention, means are provided to substantially obviate uncolored reflection approximate the light source so that the maximum color effect of a reflected beam impinging on the reflector will be directed back approximate the light source. In accordance with one embodiment of this invention the uncolored image of the light source is reduced substantially to the vanishing point. This is accomplished by a suitable formation of the front face of the reflector, as by giving it a curved, in most cases a spheric, form. In order, however, to secure, for instance, a prismatic plate of uniform thickness or depth, the reflecting aperture is arranged to conform to the front face while the axes of the reflecting units are parallel.

In accordance with this invention the reflector may be formed basically and generally in accordance with the process and by the mold described in Patent No. 1,591,572. One of the mold members is, however, provided with a spheric front-forming surface while the other mold member has the elements thereof assembled and arranged to conform the reflector forming matrix thereof generally to that spheric surface. This is accomplished by locating the elements by a spherical surface while the axes of these elements remain parallel.

Referring now to the accompanying drawings, 1 designates a plate, which is in this particular embodiment, of circular contour, although it will be understood that the reflector may be of any other suitable formation. It may be provided with a rim 2 so as to fit a suitable holder. The reflector is, in this particular embodiment, in the form of a prismatic plate formed of pressed glass. It has on the back thereof a series of reflecting units 3 which in this particular embodiment are shown as triple reflectors of the character described in Patent No. 1,591,572 and Patent No. 1,671,086. The front face 4 of the reflector is spheric, the radius of curvature of which may be varied to suit requirements, the particular radius shown being suitable to obtain the desired results, although it will be understood that various other curved formations may be employed. The units as assembled to form the reflecting apertures, conform generally to and follow the spheric front face of the reflector and the axes of these units are parallel.

Where the reflecting units are triple reflectors arranged in contiguous relation to form the reflector apertures, each of these units has reflecting surfaces arranged relatively at approximate right angles and in a circuit around the axes thereof, so that light impinging thereon from a distant source will be reflected about said axes and back approximate the light source. As described in said patents, however, one or more of the reflecting surfaces may deviate as a whole slightly from optically true right angular relation, in order to cause a definite spread of the reflected light while by the formation of the surfaces or the medium employed, the reflected light is distributed throughout the field of spread in order to direct a definite spreading beam of substantial uniform intensity back towards and visible to an observer located a substantial distance outside the line connecting the reflector with the light source.

Figure 2:
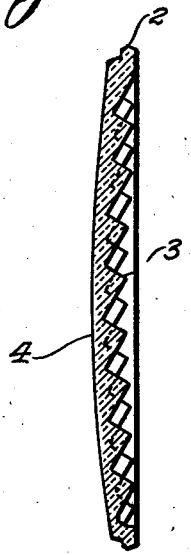
Fig. 2 is a section on line 2—2, Fig. 1.

The action of the reflector, more particularly in obviating uncolored reflection, will now be understood. Assuming the reflector to be made of color tinted glass such as red glass, if the front face of the reflector were flat or otherwise formed not to secure the desired result, there would be a surface reflection so that the image of the headlight would appear by surface reflection and partially if not wholly obscure the color reflection. Upon reference to Fig. 2, it will be seen, however, that since the front face of the reflector forms a spherical mirror the image of the headlight is reduced. Where, as is the case in practice, the headlight is away from the reflector, and therefore, the mirror, a distance which is large compared to the radius of curvature and the principal focus, the image of the head light will be reduced substantially to the vanishing point at the focus. Accordingly, uncolored reflection is substantially obviated so that the color effect will be a maximum. It will, of course, be obvious that a similar effect will be obtained by making the front face concave instead of convex, with respect to the observer; for practical purposes, however, the convex form has many advantages. Due to the fact that the axis of the reflecting units are maintained parallel, the general beam structure of the reflected light towards the observer approximate the source is maintained. By conforming the reflecting surfaces generally to the front face the depth or thickness of the glass is maintained, which is desirable.

Figure 3:
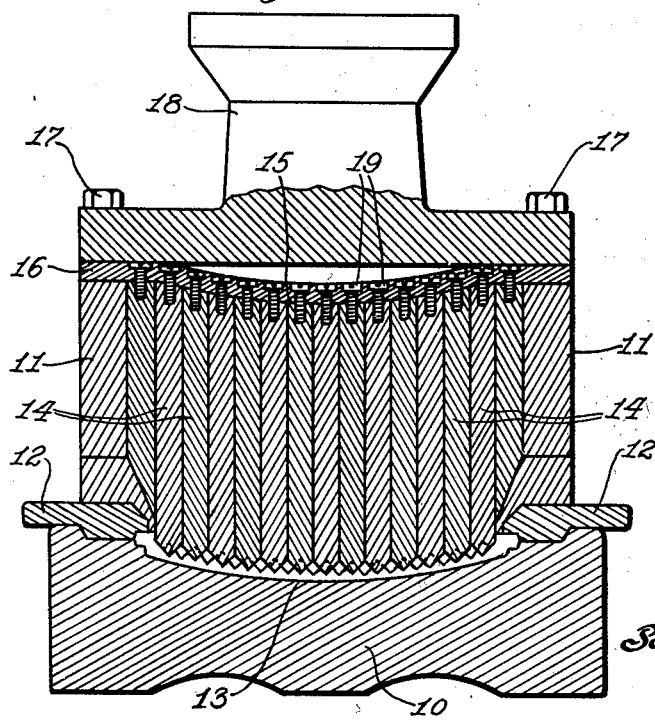
Fig. 3 is a vertical section of an apparatus and illustrating a process for making reflectors embodying this invention.

Referring now to Figure 3, which corresponds in general to Figure 1 of Patent No. 1,591,572, 10 and 11 designate the mould members, 10 being the mould proper while 11 is the plunger; the usual ring is shown at 12. The bottom of the mould cavity is made spheric, as shown at 13, to form the desired front face of the reflector. The plunger 11 carries a series of mould elements 14, which are formed as described in Patent No. 1,591,572, to provide, when assembled, a matrix for forming the reflecting surfaces. The reflector-forming faces of the mould elements are provided at the ends thereof; the other ends of these elements, however, bear against a spheric surface 15 conforming to the surface 13 in the mould cavity. The surface 15 may be on a part 16 attached to the plunger, as by screws 17, attaching 11 and 16 to the head 18. The ends of the mould elements engaging the surface 15 are preferably rounded, as shown, and these elements are secured in the part 16 by screws 19.

With the mould as shown, the mould elements are secured in position with their axes parallel, but with the matrix conforming generally to the surface 13, forming, as it does, the front face of the reflector. The pressing operation may now be proceeded with in the manner described in Patent No. 1,591,572, and it will be seen that by the apparatus, the reflector shown in Figures 1 and 2 will be accurately formed to shape, in order to produce a spheric front face and a series of reflecting units on the back, conforming generally to this front face.

While the invention is particularly applicable to the general type of reflector specifically shown and described, it will be understood that the invention is applicable in many cases to other forms and types of reflectors. Thus, while a triply reflecting unit is particularly useful and particularly permits attainment of the objects of this invention, when employed as described, other reflecting units adapted to direct light impinging thereon at varying angles back approximate the light source may be employed. Moreover, while the invention is particularly applicable to glass reflectors, it will be understood that the term "glass" is used descriptively and not limitatively. Furthermore, in many of its phases, the invention is applicable to other than prismatic reflectors, as many features of this invention are applicable to reflectors of the hollow or metallic type; in which case, of course, the front of the reflector will provide a cover glass, which is in such case formed to obviate uncolored reflection in the manner described. While the front face of the reflector is preferably spheric, in order to attain the most desirable results, it will be understood that it may be spheric functionally only; it is, therefore, to be understood that the terms "spheric" and "spherical" are used descriptively and not limitatively. It will, furthermore, be understood that certain features, operations and sub-combinations are of utility and may be employed without reference to other features, operations and sub-combinations; that is contemplated by and is within the scope of the appended claims. It is, furthermore, obvious that various changes may be made in details and operations, within the scope of the appended claims, without departing from the spirit of this invention. It is, therefore, to be understood that this invention is not to be limited to the specific details and operations shown and/or described.

The process and mold are not claimed herein but are claimed in application Serial No. 407,816, filed November 18, 1929.

Having thus described the invention, what is claimed is:

1. A reflecting device of the character described, comprising, a series of reflecting units arranged in contiguous relation and having reflecting surfaces adapted to direct light impinging thereon at varying angles back approximate the light source, and a light coloring screen in front of the reflecting surfaces, the reflector having a transparent front face curved to substantially reduce the uncolored image of the light source.

2. A reflecting device of the character described, comprising, a series of reflecting units arranged in contiguous relation and having reflecting surfaces adapted to direct light impinging thereon at varying angles back approximate the light source, and a light coloring screen in front of the reflecting surfaces, the reflector having a spheric front transparent face.

3. A reflecting device of the character described, comprising, a color-tinted transparent prismatic plate having a series of reflecting units arranged in contiguous relation, the reflecting surfaces of which are adapted to direct light impinging thereon at varying angles back approximate the light source and having a front face curved to substantially reduce the uncolored image of the light source.

4. A reflecting device of the character described, comprising, a color-tinted transparent prismatic plate having a series of reflecting units arranged in contiguous relation and having reflecting surfaces adapted to direct light impinging thereon at varying angles back approximate the light source, said plate having a spheric front face.

5. A reflecting device of the character described, comprising, a color-tinted transparent prismatic plate having a series of reflecting units arranged in contiguous relation and having reflecting surfaces adapted to direct light impinging thereon at varying angles back approximate the light source, said plate having a spheric front face and said units conforming to the front face.

6. A reflecting device of the character described, comprising, a color-tinted transparent prismatic plate having a series of reflecting units arranged in contiguous relation and having reflecting surfaces adapted to direct light impinging thereon at varying angles back approximate the light source, said plate having a spheric front face and said units conforming to the front face but with their axes parallel.

7. A reflecting device of the character described, comprising, a series of reflecting units arranged in contiguous relation, each of said units having reflecting surfaces arranged relatively at approximate right angles and in a circuit around the axis thereof so that light impinging thereon from a distant source will be reflected about said axis and back approximate the light source, and a light coloring screen in front of the reflecting surfaces, the reflector having a transparent front face curved to substantially reduce the uncolored image of the light source.

8. A reflecting device of the character described, comprising, a color-tinted transparent prismatic plate having a series of reflecting units arranged in contiguous relation, each of said units having totally reflecting surfaces arranged relatively at approximate right angles and in a circuit around the axis thereof, said plate having a spheric front face.

9. A reflecting device of the character described, comprising, a color-tinted transparent prismatic plate having a series of reflecting units arranged in contiguous relation, each of said units having totally reflecting surfaces arranged relatively at approximate right angles and in a circuit around the axis thereof, said plate having a spheric front face and the axes of said units being parallel.

10. A reflecting device of the character described having, a series of reflecting surfaces arranged in a circuit about a reflector axis and adapted to direct light impinging thereon at varying angles back approximate the light source, a light coloring screen in front of the reflecting surfaces, said screen being curved to substantially obviate uncolored reflection approximate the light source.

11. A reflecting device of the character described having, a series of reflecting surfaces arranged in a circuit about a reflector axis and adapted to direct light impinging thereon at varying angles back approximate its source, and a spheric light coloring screen in front of the reflecting surfaces.

In testimony whereof I affix my signature this 30th day of October, 1928.

JONATHAN CASS STIMSON.